United States Patent [19]
Kawamura

[11] Patent Number: 5,959,679
[45] Date of Patent: Sep. 28, 1999

[54] SCAN CONVERTER FOR CONVERTING A VIDEO SIGNAL FOR A TELEVISION RECEIVER

[75] Inventor: Yasunori Kawamura, Kyoto, Japan

[73] Assignee: Rohm Co. Ltd., Kyoto, Japan

[21] Appl. No.: 08/951,520

[22] Filed: Oct. 16, 1997

[30] Foreign Application Priority Data

Oct. 16, 1996 [JP] Japan .................................. 8-273317

[51] Int. Cl.$^6$ ................................................ H04N 7/01
[52] U.S. Cl. .......................... 348/446; 348/451; 348/453
[58] Field of Search .................... 348/446, 451, 348/453, 457, 441, 510, 450; 345/202

[56] References Cited

U.S. PATENT DOCUMENTS

| | | | |
|---|---|---|---|
| 5,268,756 | 12/1993 | Vavreck et al. | 348/441 |
| 5,493,418 | 2/1996 | Takahashi et al. | 358/451 |
| 5,526,055 | 6/1996 | Zhang et al. | 348/510 |
| 5,642,169 | 6/1997 | Yamamoto et al. | 348/453 |
| 5,790,110 | 8/1998 | Baker et al. | 345/202 |

*Primary Examiner*—Victor R. Kostak
*Attorney, Agent, or Firm*—Nikaido Marmelstein Murray & Oram LLP

[57] ABSTRACT

A scan converter converts horizontal and vertical synchronizing signals and digital R, G, and B signals fed from a computer into a television signal through digital processing that is performed by an encoder at a rate of 4×fsc (where fsc represents the frequency of the chrominance subcarrier of the television signal). The scan converter has a line memory which temporarily stores the digital signals from the computer to supply the digital signals to the encoder at the rate of 4×fsc.

6 Claims, 1 Drawing Sheet

SCAN CONVERTER FOR CONVERTING A VIDEO SIGNAL FOR A TELEVISION RECEIVER

BACKGROUND OF THE INVENTION

1. Field of the Invention

The present invention relates to a scan converter for converting R, G, and B signals output from a computer into a video signal from which a television receiver can reproduce and display images, and particularly to a scan converter for converting video signals output from a personal computer into a video signal from which a television receiver can reproduce and display images.

2. Description of the Prior Art

Usually, video images output from a personal computer are displayed on a dedicated monitor by feeding R, G, and B signals and horizontal and vertical synchronizing signals from the personal computer directly to the monitor. However, it is also possible to display such images on a television receiver if the images output from the personal computer are converted into a television signal by the use of a scan converter before they are fed to the television receiver.

A television signal refers to, for example, a video signal conforming to the NTSC (National Television System Committee) standards, i.e. a signal that carries images as successive frames each composed of 525 scanning lines that are scanned in an interlaced way such that one frame is formed by two consecutive fields. The television signal also contains horizontal and vertical synchronizing signals having frequencies of 15.734 kHz and 59.94 kHz respectively.

Here, it is assumed that the frequency of the vertical synchronizing signal output from the personal computer is 59.94 Hz, i.e. equal to the frequency of the vertical synchronizing signal of the television signal. Moreover, it is assumed that the frequency of the horizontal synchronizing signal output from the personal computer is 31.468 kHz, i.e. twice the frequency 15.734 kHz of the horizontal synchronizing signal of the television signal. This is because the personal computer is configured to output signals that form images in an non-interlaced way.

The R, G, and B signals output from the personal computer are individually converted into digital signals by an analog-to-digital converter (A/D converter). These digital signals are temporarily stored in a line buffer. The digital signals stored in the line buffer are individually converted into analog signals by a digital-to-analog converter (D/A converter), and are then fed to an encoder for analog signal processing.

The vertical synchronizing signal output from the personal computer is fed directly to the encoder. On the other hand, the horizontal synchronizing signal output from the personal computer is fed to the encoder through a frequency divider that converts the frequency of the signal to half its original frequency. Thus, when the horizontal synchronizing signal reaches the encoder, it has a frequency of 15.734 kHz, i.e. the frequency of the horizontal synchronizing signal in the NTSC television system. The frequency divider performs frequency division by outputting a pulse every second time it receives a pulse.

The encoder first reads in every second scanning line from the analog R, G, and B signals, and converts it into a luminance signal and a color difference signal. The encoder then adds to the luminance signal the horizontal and vertical synchronizing signals that it receives separately. Thereafter, the encoder modulates the color difference signal with a chrominance subcarrier, and adds the resulting signal as well as color bursts to the luminance signal. In this way, the encoder converts the R, G, and B signals into a composite video signal, and outputs it as a television signal. The television signal is fed to a television receiver to display images thereon.

However, the conventional scan converter requires an analog-to-digital converter. Moreover, since its encoder processes analog signals, the conventional scan converter requires an oscillator for generating a chrominance subcarrier. These factors have been preventing simplification of the construction of conventional scan converters and thus reduction of their cost.

SUMMARY OF THE INVENTION

An object of the present invention is to provide a low-cost scan converter that operates on a simple processing principle without requiring an analog-to-digital converter.

To achieve the above object, according to the present invention, a scan converter for converting video signals produced by a computer into a video signal for a television receiver is provided with an image processing circuit incorporated in the computer; a memory for temporarily storing digital R, G, and B signals fed from the image processing circuit; an encoder for encoding the digital R, G, and B signals fed from the memory to output a digital television signal; a digital-to-analog converter for converting the digital television signal fed from the encoder into an analog signal; and clock supplying means for supplying the encoder with an operation clock having a frequency an integer number times a frequency of a chrominance subcarrier.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
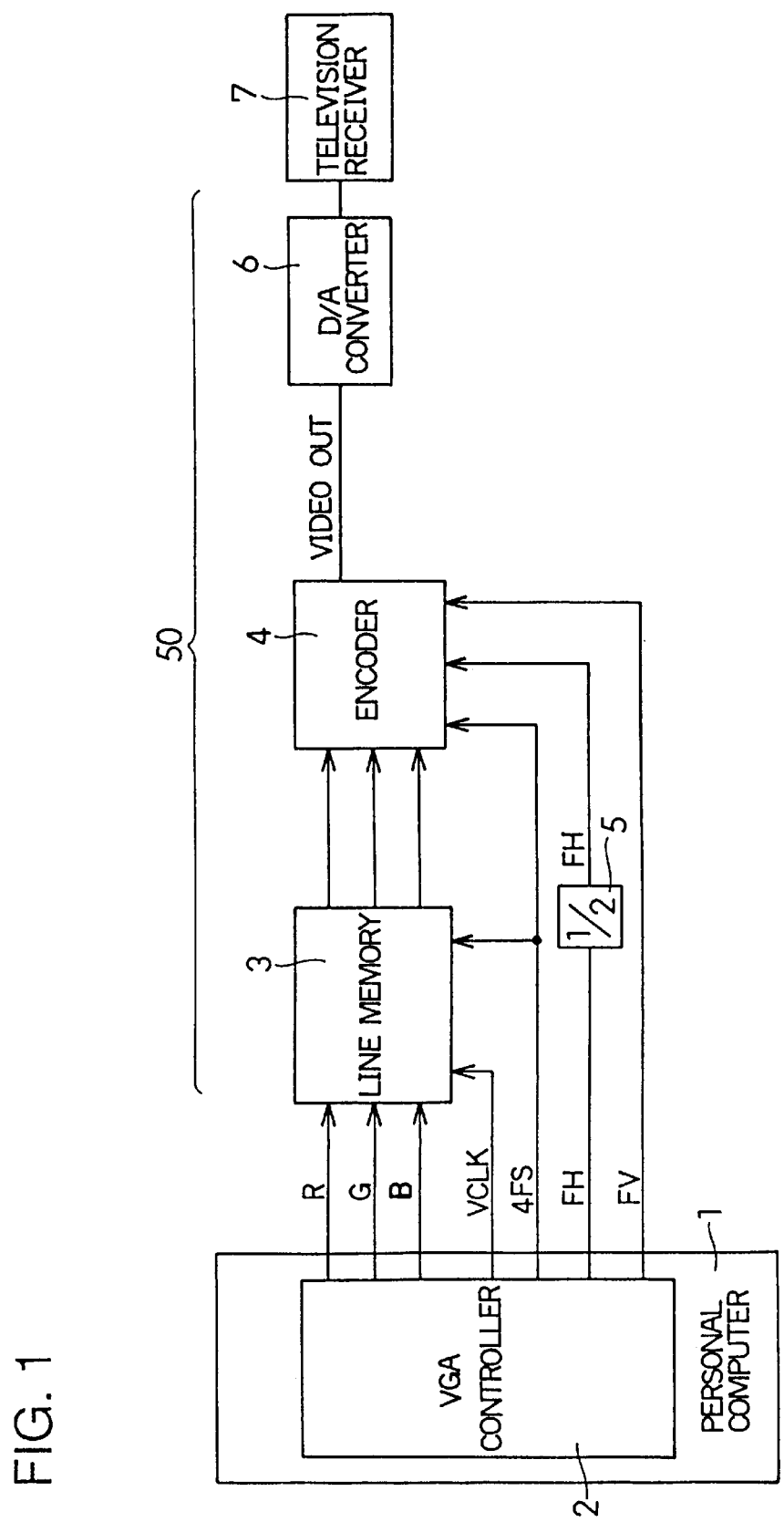
FIG. 1 is a block diagram of a scan converter embodying the present invention.

Hereinafter, an embodiment of the present invention will be described with reference to the drawing.

FIG. 1 is a block diagram of a scan converter embodying the present invention. This scan converter reads in digital R, G, and B signals output from a VGA (Video Graphics Array) controller 2 incorporated in a personal computer 1, and feeds them to a line memory 3 for temporary storage. The line memory 3 is a type of semiconductor memory device that can store parts of the R, G, and B signals that constitute one scanning line. Here, writing of the signals to the line memory 3 is performed in synchronism with the clock output from the personal computer 1. Accordingly, if it is assumed that the personal computer 1 is operating at a clock frequency of Vclk, the R, G, and B signals are fed to the line memory 3 and stored therein at a rate of Vclk.

The VGA controller 2 also outputs horizontal and vertical synchronizing signals FH and FV as well as a pulse signal 4fsc that has a repetition frequency four times the frequency fsc of the chrominance subcarrier of a television signal. The line memory 3 serves as a rate converter, receiving the R, G, and B signals at the rate of Vclk and outputting them at the rate of 4fsc. The horizontal synchronizing signal FH is, by a frequency divider 5, converted into a horizontal synchronizing signal Fh having half its original frequency. In all, the R, G, and B signals, the signal having a frequency of 4fsc, and the vertical and horizontal synchronizing signals FV and Fh are fed to an encoder 4. The encoder 4 converts, at the rate of 4fsc, these signals into a television signal Video OUT.

In the following descriptions, it is assumed that the encoder 4 converts the R, G, and B signals into a television signal Video OUT in NTSC format. Let the digital values of the R, G, and B signals fed to the encoder 4 be ER, EG, and EB respectively. Then, the luminance signal EY and the chrominance signal ES are obtained through calculation according to the following formulae:

$$EY = 0.299 \times ER + 0.587 \times EG + 0.114 \times EB,$$

$$ES = (ER-EY)\cos(\omega t)/1.14 + (EB-EY)\sin(\omega t)/2.03, \quad (1)$$

where $\omega = 2\pi \times fsc$, and t represents time. In the NTSC system, fsc=3.5795 MHz. Although formula (1) includes terms cos ($\omega t$) and sin($\omega t$), the digital processing performed by the encoder 4 at the rate of 4fsc keeps these terms equal to 0, +1, or −1, and therefore the chrominance signal ES can be calculated without difficulty. Note that the luminance signal EY and the chrominance signal ES may be calculated according to any formula that achieves similar effects. Next, a television signal V is obtained by synthesizing the luminance and chrominance signals EY and ES according to the following formula:

$$V = EY + ES.$$

Eventually, the horizontal and vertical synchronizing signals Fh and FV as well as color bursts are added to the signal V, and the resulting composite signal is output as a television signal Video OUT from the encoder 4. Since this television signal Video OUT is a digital signal, it is then converted into an analog signal by a digital-to-analog converter 6 before it is fed to a television receiver 7 to display images thereon.

The scan converter of the embodiment assumes that the clock frequency Vclk of the personal computer 1 is 25.454 MHz (4fsc×16/9), and that the frequency FH of the horizontal synchronizing signal is 31.194 kHz (Vclk/816=4×fsc/459). Accordingly, the frequency FV of the vertical synchronizing signal is 59.417 Hz (FH/525). Note that, although the frequency of the horizontal synchronizing signal Fh obtained by dividing the frequency of the horizontal synchronizing signal FH by two by means of the frequency divider 5 and the frequency of the vertical synchronizing signal FV are slightly deviated from the standard values in the NTSC system, these deviations are within the limits tolerated by the television receiver 7.

FH and FV each take a value that is equal to Vclk divided by a natural number and simultaneously equal to 4fsc divided by a natural number. As a result, the horizontal and vertical synchronizing signals FH and FV are kept in synchronism with Vclk and 4fsc. This helps to prevent latching errors that may occur when the encoder 4 adds the horizontal and vertical synchronizing signals Fh and FV to the television signal V, and thus to prevent jitters that vertically and horizontally shake or vibrate the images displayed on the television receiver 7.

The scan converter of the embodiment can be used to produce a television signal not only in NTSC format, but also in, for example, PAL format, provided that the encoder 4 is configured accordingly. For the PAL system, almost the same processing method as used for the NTSC system can be used. However, the PAL system uses a different number of scanning lines and different frequencies FH, FV, and fsc of the horizontal and vertical synchronizing signals and of the chrominance subcarrier. Moreover, in formula (1), the phase and the sign of the term (ER−EY) is reversed every scanning line.

Specifically, when the scan converter of the embodiment is used to produce a television signal Video OUT in PAL format, the relationship between the frequencies of the relevant signals are typically as follows. Since, in the PAL system, the frequency fsc of the chrominance subcarrier is 4.4336 MHz, 4fsc=17.734 MHz. The clock frequency Vclk of the personal computer 1 is assumed to be 24.674 MHz (4fsc×32/23), and the frequency FH of the horizontal synchronizing signal is assumed to be 30.842 kHz (Vclk/800= 4fsc/575). Accordingly, considering that the PAL system uses 625 scanning lines per frame, the frequency FV of the vertical synchronizing signal is 49.348 Hz (FH/625).

Note that, although the frequency (15.421 kHz) of the horizontal synchronizing signal Fh obtained by dividing the frequency of the horizontal synchronizing signal FH by two by means of the frequency divider 5 and the frequency of the vertical synchronizing signal FV are slightly deviated from the standard values in the PAL system, these deviations are within the limits tolerated by the television receiver 7. Here is an overview of the relationship between the frequencies of the relevant signals in the NTSC and PAL systems:

|      | NTSC System         | PAL System          |
| ---- | ------------------- | ------------------- |
| 4fsc | 14.318 MHz          | 17.734 MHz          |
| Vclk | (4fsc × 16 / 9)     | (4fsc × 32 / 23)    |
|      | 25.454 MHz          | 24.674 MHz          |
| FH   | (Vclk / 816)        | (Vclk / 800)        |
|      | (4fsc / 459)        | (4fsc / 575)        |
|      | 31.194 kHz          | 30.842 kHz          |
| FV   | (FH / 525)          | (FH / 625)          |
|      | 59.417 Hz           | 49.348 Hz           |

In the above list, each frequency is presented with five significant digits. In both of the NTSC and PAL systems, the horizontal and vertical synchronizing frequencies each take a value that is equal to the clock frequency Vclk divided by a natural number. This helps to keep the horizontal and vertical synchronizing signals FH and FV in synchronism with the clock frequency Vclk as well as with the conversion rate 4fsc of the encoder 4, and thus to prevent latching errors that may occur in the encoder 4.

Note that the clock frequency Vclk is not limited to any specific value noted heretofore; specifically, it can be set to any value as long as the horizontal and vertical synchronizing frequencies FH and FV are each equal to the clock frequency Vclk divided by a natural number and equal to 4fsc divided by a natural number and, in addition, their deviations from the standard values are within the limits tolerated in the television system used. As long as this frequency relationship is observed, it is possible to display images properly on the television receiver 7.

During the period in which parts of the R, G, and B signals that constitute two scanning lines are output from the VGA controller 2 and stored in the line memory 3, a part of the television signal Video OUT that constitutes one scanning line is output from the encoder 4. Since the R, G, and B signals output from the VGA controller 2 are intended for non-interlaced scanning, whereas the television signal Video OUT is intended for interlaced scanning, the line memory 3 has only to store parts of the R, G, and B signals that constitute one scanning line.

Moreover, the principal portion 50 of the scan converter of the embodiment can be incorporated, for example, in a home-use video game machine. This makes it possible to display the images produced by the video game machine on the television receiver 7.

What is claimed is:

1. A scan converter for converting video signals produced by a computer into a video signal for a television receiver, comprising:

an image processing circuit incorporated in the computer;

a memory for temporarily storing digital R, G, and B signals fed from the image processing circuit;

an encoder for encoding the digital R, G, and B signals fed from the memory to output a digital television signal;

a digital-to-analog converter for converting the digital television signal fed from the encoder into an analog signal; and clock supplying means for supplying the encoder with an operation clock having a frequency an integer number times a frequency of a chrominance subcarrier, wherein the memory is a line memory that outputs the digital R, G, and B signals in synchronism with the clock supplied from the clock supplying means.

2. A scan converter as claimed in claim 1, wherein the encoder also processes horizontal and vertical synchronizing signals fed from the computer.

3. A scan converter as claimed in claim 1, wherein the horizontal synchronizing signal has a frequency of 4×fsc/N (where N is a natural number), and the vertical synchronizing signal has a frequency of 4×fsc/M (where M is a natural number).

4. A scan converter for converting horizontal and vertical synchronizing signals and R, G, and B signals fed from a computer into a television signal through digital processing performed by an encoder, wherein the encoder performs digital processing at a rate of 4×fsc (where fsc represents frequency of a chrominance subcarrier of the television signal) to achieve conversion, wherein, by using digital values ER, EG, and EB of the digital R, G, and B signals fed from the computer, the encoder produces a luminance signal EY and a chrominance signal ES by calculating $$EY = 0.299 \times ER + 0.587 \times EG + 0.114 \times EB, \text{ and}$$

$$ES = (ER-EY)\cos(\omega t)/1.14 + (EB-EY)\sin(\omega t)/2.03$$

(where $\omega = 2\pi \times fsc$, and t represents time), and produces the television signal by calculating EY+ES.

5. A scan converter as claimed in claim 4, wherein the horizontal synchronizing signal has a frequency of 4×fsc/N (where N is a natural number), and the vertical synchronizing signal has a frequency of 4×fsc/M (where M is a natural number).

6. A scan converter as claimed in claim 5, wherein the digital R, G, and B signals fed from the computer are subjected to rate conversion before they are converted into the television signal by the encoder.

* * * * *